United States Patent Office 2,833,701
Patented May 6, 1958

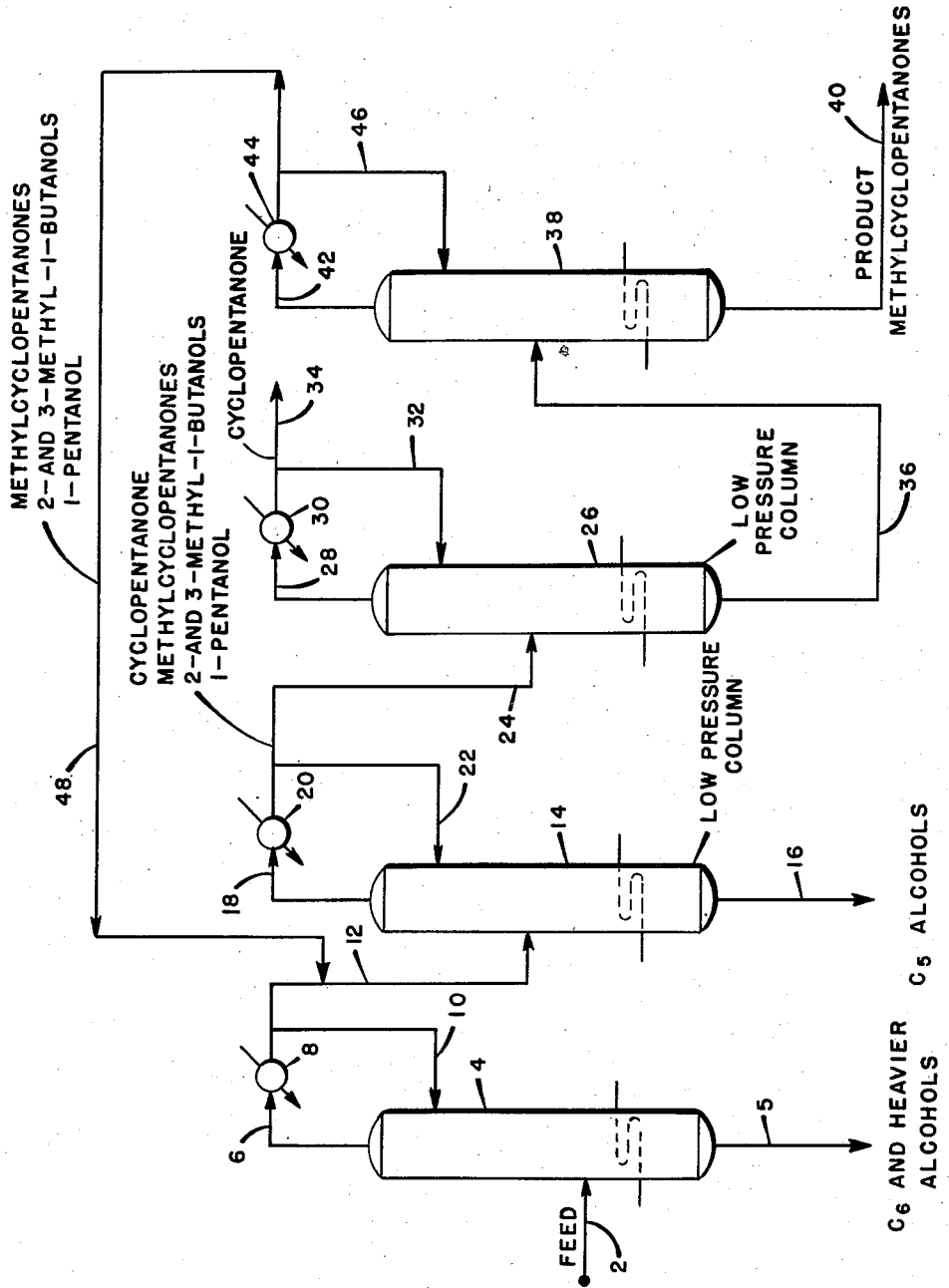

2,833,701

VACUUM DISTILLATION OF CRUDE C₅ ALCOHOLS

Kent R. Barnard, Tulsa, Okla., assignor to Pan American Petroleum Corporation, a corporation of Delaware Application August 13, 1954, Serial No. 449,679

8 Claims. (Cl. 202—52)

The present invention relates to a novel method for the separation of alcohols from mixtures thereof containing ketones which either azeotrope with or which boil close to the boiling point of such alcohols. More particularly, it pertains to a method for separating various of the amyl alcohols from ketones which either azeotrope therewith such as, for example, cyclopentanone, 2-methylcyclopentanone and 3-methylcyclopentanone (hereinafter referred to as methylcyclopentanones), or which boil so close to the boiling point of said various amyl alcohols that separation by means of straight fractional distillation is impossible.

Mixtures containing 1-pentanol, 2-methyl-1-butanol and 3-methyl-1-butanol or at least one of these alcohols, together with at least one of the aforesaid ketones cannot be satisfactorily separated by means of ordinary fractional distillation methods owing to the fact that 2-methyl-1-butanol and 3-methyl-1-butanol, which boil at 128.9° C. and 132° C., respectively, form azeotropes with cyclopentanone (B. P. 130.7° C.) boiling at approximately 127.0° C. and 129.5° C, respectively, while the methylcyclopentanones, which boil at 138–145° C., cannot be separated from 1-pentanol boiling at 138° C. Although the problem of separating various of the abovementioned amyl alcohols from cyclopentanone or methylcyclopentanones occurs in numerous purification procedures, one of the principal instances where an efficient method for the separation of these compounds is most urgently needed is in their recovery, along with other chemicals, from both the water and oil fractions produced by the reduction of carbon monoxide with hydrogen in the presence of a fluidized alkali-promoted iron catalyst under known synthesis conditions. The magnitude of this problem may be more fully appreciated when it is realized that in hydrocarbon synthesis plants designed for commercial operation and having a capacity of about 6,000 barrels per day of liquid hydrocarbons, there are produced in the water stream alone approximately 4200 pounds of amyl alcohols per day and about 1,000 pounds per day of cyclopentanone and methylcyclopentanones. Both classes of these compounds are found in the oil stream in even greater amounts than they normally occur in the aqueous fraction. Specifically, mixtures of these alcohols and ketones obtained from the water stream usually contain from about 8 to 15 percent cyclopentanone, 6 to 10 percent methylcyclopentanones, 40 to 50 percent 1-pentanol, 7 to 10 percent 2-methyl-1-butanol and 8 to 11 percent 3-methyl-1-butanol, together with about 15 to 25 percent of a high-boiling residue, 40 to 50 percent of which consists of various carbonyl fractions.

Attempts have previously been made to separate the above-mentioned amyl alcohols from one another and from the aforesaid ketones by distilling a crude mixture containing these alcohols and ketones up to a temperature of about 87° C. Thereafter, a second fraction boiling from about 87° C. to about 138° C. was collected, after which the resulting distillate was azeotropically distilled with water until the overhead being obtained was substantially free of ketones. Distillation of the mixture under such conditions yielded a bottoms of 1-pentanol and an overhead fraction containing 2-methyl-1-butanol and 3-methyl-1-butanol, cyclopentanone, methylcyclopentanones and a small amount of 1-pentanol. This overhead fraction was distilled until all of the water had been removed, after which the resulting dry mixture of alcohols and ketones was subjected to distillation under a pressure of about 40 mm. By this operation, however, a sizable fraction boiling from about 54° C. to about 62° C. was obtained which contained the bulk of the 2-methyl-1-butanol and the 3-methyl-1-butanol, together with a large portion of the ketones which passed overhead along with the alcohols. In order to effect a separation between these alcohols and ketones, the distillate collected at 54° C. to 62° C. (40 mm.) was subjected to distillation at atmospheric pressure whereby there were obtained two overhead fractions; one boiling at 130° C. and the other boiling at about 138° C. to 140° C. The bottoms fraction was relatively small and consisted essentially of high-boiling ketone polymers. The aforesaid fraction boiling at about 130° C. contained approximately 90 percent alcohols (2-methyl-1-butanol and 3-methyl-1-butanol) but was still contaminated with about 10 percent ketones, whereas approximately 75 percent of the methylcyclopentanones was obtained in a relatively pure condition in the fraction boiling at 138° C. to 145° C. The above procedure suffers several serious disadvantages. Because of the large number of repeated distillations, considerable mechanical losses of materials occur, and the heat-sensitive ketones are polymerized. Also, the separation does not completely resolve the mixture, since a final fraction is obtained at 130° C. (760 mm.) which contains appreciable amounts of both methylbutanols and methylcyclopentanones.

Likewise, efforts have been made to separate the aforesaid C₅ alcohols from one another and from said ketones by first topping up to a temperature of about 120° C. a crude mixture of the alcohols and ketones to remove low-boiling components. Thereafter, the resulting residue was subjected to distillation and the overhead collected up to a temperature of about 138–140° C. By this means, the higher boiling impurities present in the original mixture were removed as bottoms. The overhead fraction referred to contained essentially normal and branched-chain C₅ alcohols, cyclopentanone, and the methylcyclopentanones. To separate the branched-chain alcohols from the 1-pentanol, the overhead was subjected to fractionation and the portion boiling from about 120–134° C. collected. Although this fraction was thought to contain only the branched C₅ alcohols and cyclopentanone, it was found that cyclopentanone also tended to take over with it some 1-pentanol while the branched-chain C₅ alcohols carried along appreciable amounts of methylcyclopentanones. Consequently, under such circumstances, separation and purification of the desired components in said crude mixture by the above-mentioned procedure was found to be impossible.

Accordingly, it is an object of my invention to provide a simplified and efficient method for separating the aforesaid isomeric C₅ alcohols from ketones such as, for example, cyclopentanone and the methylcyclopentanones. It is a still further object to recover 1-pentanol in good yields from such mixtures in substantially pure form. Another object of my invention is to provide a process for the separation of 1-pentanol, 2-methyl-1-butanol and 3-methyl-1-butanol from mixtures containing ketones at least some of which azeotrope with 1-pentanol and some of which azeotrope with 2-methyl-1-butanol and 3-methyl-1-butanol, which process involves the maintenance of a sufficiently high concentration of branched C₅ alcohols in the fractionation zone during the initial distillation step so that a substantially pure C₅ alcohol fraction is secured as bottoms and a narrow-boiling mixture, containing the ketones and a portion of the branched C₅ alcohols, is collected overhead.

I have now discovered that the foregoing disadvantages in the methods previously used for effecting the separation herein desired can be avoided and that each of the alcohols and ketone components in mixtures of the type mentioned above can be recovered in a highly purified condition. In accordance with one embodiment of my invention, a mixture of C₅ alcohols and close-boiling ketones, from which both low- and high-boiling impurities have been removed, is subjected to distillation in an efficient fractionation column at reduced pressure and at a temperature sufficiently high at the prevailing pressure to remove all of the ketone component overhead. In doing so, some of the branched chain C₅ alcohols are taken overhead as a narrow-boiling mixture with the ketone fraction. However, with the exception of a very small percentage, all of the 1-pentanol which, in general, is the prinicipal component of such mixtures, is recovered in the bottoms fraction, together with branched C₅ alcohols. The latter may then be separated from the 1-pentanol relatively easily and in substantially pure form by distillation of the mixture at atmospheric pressure.

Pressures employed during the above-mentioned distillation may generally range from about 30 to about 100 mm. at the top of the tower. Corresponding temperatures required for these pressures range from about 50 to about 80° C.; usually, I prefer to employ a temperature of from about 55° to about 65° C. and a pressure of from about 45 to about 55 mm. Ordinarily, substantially higher pressures than those just recited are considered undesirable to employ at this stage of the process because of the relatively high bottoms temperature required to bring the desired components overhead. Moreover, the azeotropes involved in such operation are leaner with respect to ketones at the higher pressures. Also, higher temperatures, particularly over extended periods of time, tend to convert the ketones present into undesirable polymeric products.

The overhead from the aforesaid distillation operation is further fractionated at top tower pressures of from about 30 to about 100 mm. and vapor temperatures of from about 45° to about 75° C., preferably at pressures of from about 45 to about 55 mm. and at temperatures of from about 55° to about 60° C. This feed material, which consists essentially of a narrow-boiling mixture of ketones and branched-chain C₅ alcohols, on fractionation under the conditions of temperature and pressure just mentioned yields a distillate of substantially pure cyclopentanone and constitutes substantially all of the cyclopentanone present in the original mixture. The bottoms fraction thus obtained consists essentially of methylcyclopentanones, branched C₅ alcohols, and a small amount of 1-pentanol. This bottoms fraction is distilled (hereinafter referred to as the methylcyclopentanones recovery step) at top tower pressures from about 300 to about 800 mm. and at vapor temperatures of from about 100° to about 130° C., preferably at pressures of from about 300 to about 500 mm. and at vapor temperatures of from about 100° to about 115° C., to yield an overhead containing principally branched C₅ alcohols, generally together with small amounts of methylcyclopentanones and 1-pentanol. The bottoms fraction from this last-mentioned distillation step consists essentially of methylcyclopentanones.

The division of branched-chain C₅ alcohols between the bottoms and distillate in the vacuum distillation step first mentioned can be controlled by the pressure employed and the proportion of the branched C₅ alcohols to ketones in the feed to this operation. Thus, if an excess of branched C₅ alcohols is maintained over the ratio required by the branched C₅ alcohol-methylcyclopentanone azeotropes, the branched C₅ alcohols can be forced into the bottoms fraction with the 1-pentanol and later fractionated therefrom at atmospheric pressure to yield individual cuts of substantially pure 1-pentanol and branched C₅ alcohols. Therefore, the greater the excess of branched C₅ alcohols in the feed, the less vacuum will be required for a satisfactory separation of the desired materials. Utilizing this phenomenon, I may take the overhead fraction from the aforesaid methylcyclopentanones recovery step which is rich in branched C₅ alcohol and combine this stream with the feed to the initial vacuum distillation step. In this manner, a relatively high concentration of branched C₅ alcohols within the vacuum distillation column is assured which, in turn, enables substantially complete removal of the ketone component into the overhead while additional branched C₅ alcohols coming in with the fresh feed are forced into the bottoms along with 1-pentanol, as previously indicated. This result is made possible because the composition of the aforesaid recycle stream with respect to branched C₅ alcohols is maintained at a substantially constant value.

The process of my invention may be further illustrated by the following specific example:

EXAMPLE

A crude mixture from which low-boiling impurities such as, for example 1-butanol, had been removed, having the following composition, was selected to be purified in accordance with the invention herein described.

*Table 1*

| Compound: | Amount-pounds |
|---|---|
| Cyclopentanone | 84 |
| Methylcyclopentanones | 68 |
| 2-methyl-1-butanol and 3-methyl-1-butanol | 205 |
| 1-pentanol | 483 |
| C₆ and heavier alcohols | 160 |

The above mixture is processed in accordance with the scheme shown in the accompanying flow diagram wherein said mixture is introduced through line 2 into an intermediate section of fractionating column 4, at an hourly rate of 1000 pounds. Column 4 is operated at a top tower pressure of 800 mm. and a vapor temperature of about 133° C. Under these conditions, all components of the mixture, with the exception of the C₆ and heavier alcohol fraction, which is withdrawn from the system through line 5 at the rate of 160 pounds per hour, are taken overhead through line 6 and condenser 8 with a portion of this stream being returned as reflux to the column through line 10. The bulk of the overhead, however, is transferred through line 12 to column 14, operated at a top tower pressure of 50 mm., and at a vapor temperature of about 60° C. Under the conditions at which column 14 is operated, a C₅ alcohols fraction containing both branched and normal C₅ alcohols and having less than .5 weight percent of ketone impurity is withdrawn through line 16 at the rate of about 688 pounds per hour. 1-pentanol may be recovered in substantially pure form by subjecting this C₅ alcohols fraction to distillation at atmospheric pressure. The overhead from the operation of column 14 is taken off through line 18 and condenser 20 with a portion of this stream being returned to the column through line 22. This overhead fraction contains 84 pounds of cyclopentanone, 72 pounds of methylcyclopentanones, 40 pounds of 2- and 3-methyl-1-butanol and 5 pounds of 1-pentanol. Such mixture is transferred through line 24 to column 26 at the rate of 201 pounds per hour. Column 26 is likewise operated at reduced pressure, the top tower pressure being 50 mm. and the vapor temperature being 56° C. By operation of column 26 under these conditions, substantially pure cyclopentanone is withdrawn through line 28 and condenser 30 at the rate of about 84 pounds per hour. A small reflux of this stream to the tower is maintained via line 32, while the balance of the product cyclopentanone is removed through line 34. The bottoms fraction from this operation is removed from column 26 through line 36 at a rate of 117 pounds per hour and introduced into column 38 which is operated at a top tower pressure of about 500 mm. and at a vapor temperature of about 115° C. The bottoms product from this distillation operation, which is withdrawn from line 40 at the rate of 68 pounds per hour, consists essentially of the methylcyclopentanones and is substantially free from $C_5$ alcohols. Overhead a stream is taken through line 42 and condenser 44, a portion thereof being returned to the column through line 46 as reflux, and the balance, amounting to 49 pounds per hour, being combined with the feed to column 14 in line 12 via line 48. This overhead stream transported through line 48 contains 4 pounds of methylcyclopentanones, 40 pounds of 2- and 3-methyl-1-butanol and about 5 pounds of 1-pentanol. By recycling this overhead stream to column 14, it will be seen that I am able to maintain a relatively constant concentration of branched-chain $C_5$ alcohols in the fractionation zone of said column. As a result of the creation of such conditions in column 14, substantially all newly added $C_5$ alcohols coming into the system through line 2 are forced into the bottoms fraction of column 14 and removed therefrom by means of line 16. Such conditions also provide for the substantially complete removal of methylcyclopentanones as a bottoms fraction in column 38.

While the foregoing description of the accompanying flow diagram illustrates advantageous embodiments of my invention, it is to be understood that the scope thereof is not necessarily limited thereto. On the contrary, my invention is to be construed broadly with respect to the description and to the claims; and, in general, it is to be understood that any modification or equivalents which would naturally occur to those skilled in the art are to be considered as lying within the scope of my invention.

Thus, if desired, the fundamental features of my invention may be employed in processing mixtures of the type contemplated herein without first separating the low- and high-boiling contaminants from the compounds which it is desired to recover. Under such circumstances, the higher boiling impurities would be secured along with 1-pentanol in the bottoms from the first vacuum distillation step. This bottoms fraction may then be separately processed, for example by ordinary fractionation, to recover the 1-pentanol therefrom. The overhead from the initial vacuum distillation operation, in addition to containing branched-chain $C_5$ alcohols, cyclopentanone and methylcyclopentanone, carries with it low-boiling impurities, as well as small amounts of entrained high-boiling cyclic ketones. These ketones appear with the methylcyclopentanones, as produced in accordance with my process, and the methylcyclopentanones may be separated therefrom by subjecting the mixture to ordinary fractionation, preferably at reduced pressure, i. e., at from about 30 to about 100 mm. and temperatures of from about 50° to about 90° C. The low-boiling impurities go with the cyclopentanone fraction and are separated therefrom by further distillation under superatmospheric pressure, i. e., 1500 to 2000 mm. at 140° to 150° C.

Throughout the present description and claims, the expression "close-boiling ketones" as used herein is intended to include both ketones which azeotrope with the alcohol or alcohols concerned or which boil so close thereto that separation cannot be effected by ordinary distillation techniques. Likewise, the expression "narrow-boiling mixture" is intended to cover both close-boiling mixtures and azeotropic mixtures of the alcohols and ketones concerned.

I claim:

1. In a process for the recovery of 1-pentanol, 2-methyl-1-butanol and 3-methyl-1-butanol from a crude mixture containing close-boiling ketones and wherein both low- and high-boiling impurities if originally present in said mixture have been removed therefrom, the steps which comprise subjecting said mixture to fractionation in a distillation zone at a pressure ranging from about 30 to about 100 mm. and at a temperature of from about 50° to about 80° C. to take overhead substantially all of said close-boiling ketones in the form of a narrow-boiling mixture with a substantial portion of said 2-methyl-1-butanol and 3-methyl-1-butanol together with a minor amount of 1-pentanol and withdrawing as bottoms a mixture of 1-pentanol, 2-methyl-1-butanol and 3-methyl-1-butanol substantially free from said ketones, thereafter removing the bulk of said ketones from the alcohols in the above-mentioned overhead by subjecting the latter to fractional distillation at a pressure range from about 300 to about 800 mm. at vapor temperatures of from about 100° to about 130° C. and combining the resulting alcohol-rich overhead mixture with the feed to said first-mentioned fractionation step whereby an excess of alcohols in said zone is maintained over that required to force overhead substantially all of the ketones in said crude mixture.

2. The process of claim 1 in which the first-mentioned fractionation step is effected at a pressure of from about 45 to about 55 mm., and at a temperature ranging from about 55° to about 65° C.

3. In a process for the recovery of 1-pentanol, 2-methyl-1-butanol, and 3-methyl-1-butanol from a mixture containing cyclopentanone and methylcyclopentanones and wherein both low- and high-boiling impurities if originally present in said mixture have been removed therefrom, the steps which comprise subjecting said mixture to fractionation in a distillation zone at a pressure ranging from about 30 to about 100 mm. and at a temperature of from about 50° to about 80° C. to take overhead substantially all of said cyclopentanone and methylcyclopentanones in the form of a narrow-boiling mixture with a substantial portion of said 2-methyl-1-butanol and 3-methyl-1-butanol together with a minor amount of 1-pentanol and withdrawing as bottoms a mixture of 1-pentanol, 2-methyl-1-butanol and 3-methyl-1-butanol substantially free from cyclopentanone and methylcyclopentanones, thereafter subjecting the above-mentioned overhead to further distillation at reduced pressures ranging from about 30 to about 100 mm. and at temperatures ranging from about 45° to about 75° to secure overhead substantially pure cyclopentanone, subjecting the bottoms fraction from the last-mentioned distillation, which fraction contains essentially methylcyclopentanones and 2- and 3-methyl-1-butanols, to further distillation at a pressure ranging from about 300 to about 800 mm. and at a temperature ranging from about 100° to about 130° C. to obtain a bottoms fraction of methylcyclopentanones substantially free from 1-pentanol, 2-methyl-1-butanol and 3-methyl-1-butanol and an overhead containing principally said 2- and 3-methyl-1-butanols and minor amounts of methylcyclopentanones and 1-pentanol, and combining said last-mentioned overhead with the feed to said first-mentioned fractionation step whereby an excess of alcohols in said zone is maintained over that required to force overhead substantially all of the ketones in said crude mixture.

4. The process of claim 3 in which the first-mentioned vacuum fractionation step is effected at pressures ranging from 45 to about 55 mm. and vapor temperatures of from about 55° to about 65° C. and wherein the second-mentioned vacuum fractionation is carried out at pressures ranging from 45 to about 55 mm. and at vapor temperatures of from about 55° to about 60° C.

5. The process of claim 1 in which said mixture is derived from the synthesis of hydrocarbons by the reduction of carbon monoxide with hydrogen in the presence of a hydrocarbon synthesis catalyst.

6. The process of claim 3 in which said mixture is derived from the synthesis of hydrocarbons by the reduction of carbon monoxide with hydrogen.

7. In a process for the separation of 1-pentanol, 2- methyl-1-butanol and 3-methyl-1-butanol from a crude mixture containing methylcyclopentanones and cyclopentanone, together with other higher and lower boiling impurities, the steps which comprise subjecting said mixture to fractionation in a distillation zone at a pressure ranging from about 30 to about 100 mm. and at a temperature of from about 45° to about 75° C. to take overhead substantially all of said cyclopentanone and methylcyclopentanones together with a major portion of said 2-methyl-1-butanol and 3-methyl-1-butanol and a minor amount of entrained high-boiling cyclic ketones and withdrawing as bottoms a mixture of said high-boiling impurities and 1-pentanol, 2-methyl-1-butanol and 3-methyl-1-butanol, thereafter subjecting the above-mentioned overhead to further distillation at reduced pressures ranging from about 30 to about 100 mm. and at temperatures ranging from about 40° to about 70° C. to secure overhead cyclopentanone and said low-boiling impurities, subjecting the bottoms fraction from said last-mentioned distillation, which fraction contains essentially said 2- and 3-methyl-1-butanols, said entrained high-boiling ketones, and methylcyclopentanones, to further distillation at a pressure ranging from about 300 to about 800 mm. and at a temperature ranging from about 100° to about 130° C. to obtain a bottoms fraction of methylcyclopentanones and said entrained high-boiling cyclic ketones and an overhead containing principally said 2- and 3-methyl-1-butanols and minor amounts of said methylcyclopentanones, and combining said last-mentioned overhead with the feed to said first-mentioned fractionation step whereby an excess of alcohols in said zone is maintained over that required to force overhead substantially all of the ketones in said crude mixture.

8. In a process for the separation and purification of 1-pentanol and at least one of the alcohols, 2-methyl-1-butanol and 3-methyl-1-butanol, from a crude mixture containing cyclopentanone and isomeric methyl-cyclopentanones and wherein both low- and high-boiling impurities if originally present in said mixture have been removed therefrom, the steps which comprise subjecting said mixture to fractionation in a distillation zone at a pressure ranging from about 30 to about 100 mm. and at a temperature of from about 50° to about 80° C., to take overhead substantially all of said cyclopentanone and isomeric methylcyclopentanones in the form of a narrow boiling mixture with a substantial portion of at least one of said alcohols together with a minor amount of 1-pentanol and withdrawing as bottoms a mixture of 1-pentanol and at least one of said alcohols substantially free from said cyclopentanone and methylcyclopentanones, thereafter removing the bulk of said cyclopentanone from the alcohols in the above-mentioned overhead by subjecting the latter to fractional distillation at a pressure ranging from about 30 to about 100 mm. at vapor temperatures of from about 45° to about 75° C., subjecting the bottoms fraction from the last mentioned distillation, which fractionation contains essentially methylcyclopentanones and at least one of said alcohols, to further distillation at a pressure ranging from about 300 to about 800 mm. and at a temperature ranging from about 100° to about 130° C., to obtain a bottoms fraction of methylcyclopentanones substantially free from said alcohols and 1-pentanol and an overhead containing principally at least one of said alcohols and minor amounts of methylcyclopentanones and 1-pentanol, and combining the resulting alcohol rich overhead mixture with the feed to said first mentioned fractionation step whereby an excess of at least one of said alcohols in said zone is maintained over that required to force overhead substantially all of said cyclopentanone and methylcyclopentanones in said crude mixture.

References Cited in the file of this patent

UNITED STATES PATENTS

| Number | Name | Date |
|---|---|---|
| 2,324,255 | Britton et al. | July 13, 1943 |
| 2,551,584 | Carlson et al. | May 8, 1951 |
| 2,551,593 | Gilliland et al. | May 8, 1951 |
| 2,552,911 | Steitz | May 15, 1951 |
| 2,564,200 | Grekel | Aug. 14, 1951 |
| 2,568,522 | Stritz | Sept. 18, 1951 |
| 2,571,151 | McGrath et al. | Oct. 16, 1951 |
| 2,617,757 | Michael | Nov. 11, 1952 |
| 2,635,072 | Eliot | Apr. 14, 1953 |
| 2,642,388 | Steitz | June 16, 1953 |
| 2,647,861 | Drout | Aug. 4, 1953 |